United States Patent [19]
Hamura et al.

[11] Patent Number: 5,650,078
[45] Date of Patent: Jul. 22, 1997

[54] APPARATUS FOR COOLING A LASER-TYPE WELD LINE DETECTING DEVICE OF AN INDUSTRIAL WELDING ROBOT

[75] Inventors: Masayuki Hamura; Norimitsu Uemura, both of Yamanashi, Japan

[73] Assignee: Fanuc Ltd., Yamanashi, Japan

[21] Appl. No.: 554,282

[22] Filed: Nov. 6, 1995

[30] Foreign Application Priority Data

Nov. 11, 1994 [JP] Japan ................................. 6-277865

[51] Int. Cl.$^6$ .................................................. B23K 9/095
[52] U.S. Cl. ......................... 219/130.01; 219/124.34
[58] Field of Search ........................... 219/124.34, 130.01, 219/130.21, 147

[56] References Cited

U.S. PATENT DOCUMENTS

| | | | |
|---|---|---|---|
| 4,555,613 | 11/1985 | Shulman | 219/124.34 |
| 4,599,506 | 7/1986 | Burke et al. | 219/124.34 |
| 4,652,133 | 3/1987 | Antoszewski et al. | 219/124.34 |
| 4,658,113 | 4/1987 | Vingerling | 219/147 |
| 4,784,491 | 11/1988 | Penney et al. | 219/124.34 |
| 4,794,223 | 12/1988 | Barkman et al. | 219/124.34 |
| 4,859,829 | 8/1989 | Dufour | 219/124.34 |
| 4,896,247 | 1/1990 | Cozer | 219/124.34 |
| 5,442,155 | 8/1995 | Nihei et al. | 219/124.34 |
| 5,475,198 | 12/1995 | Burke et al. | 219/124.34 |

*Primary Examiner*—Clifford C. Shaw
*Attorney, Agent, or Firm*—Nikaido, Marmelstein, Murray & Oram LLP

[57] ABSTRACT

An air cooling apparatus for a rotatable laser-type weld-line detecting device for an automatic welding machine having a welding torch applying welding to a welded portion of a workpiece to be welded, the air cooling apparatus being provided with a metallic heat-interruption housing enclosing the rotatable laser-type weld-line detecting device, a first air cooling system cooling the laser-type weld-line detecting device from around the outer surface of the device and the inner wall of the heat-interruption housing by the use of a low temperature cooling air under pressure, and a second air cooling system cooling the interior of a laser-type weld-line detecting unit emitting a detection purpose laser beam and a light receiving unit receiving and detecting the detection-purpose laser beam reflected from the welded portion of the workpiece.

9 Claims, 5 Drawing Sheets

APPARATUS FOR COOLING A LASER-TYPE WELD LINE DETECTING DEVICE OF AN INDUSTRIAL WELDING ROBOT

BACKGROUND OF THE INVENTION

1. Field of the Invention

The present invention relates to an apparatus for cooling a laser-type weld line detecting unit of an automatic welding machine such as an industrial welding robot provided with a laser welding torch. More particularly, the present invention relates to an air-cooling apparatus for cooling a laser-type weld line detecting unit by the flow of cooling air when the detecting unit is provided, therein, with a weld line detecting assembly and a built-in rotating mechanism capable of detecting both curved and linear weld lines along which the welding torch of an automatic welding machine, especially of an industrial welding robot, welds a workpiece. The welding torch welds the workpiece by an electric arc discharged therefrom toward desired welding lines on the workpiece.

2. Description of the Related Art

When an arc welding process, using the automatic welding machine such as an industrial welding robot, is carried out, the welding torch mounted on the welding machine is moved to pass through a desired curved or linear weld line in a workpiece to thereby apply arc welding to the weld line of the workpiece. During the arc welding of the automatic welding machine, the desired weld line of the workpiece is beforehand detected by a weld-line detecting device held by the automatic welding machine. Namely, the detecting device generally includes a laser-type weld-line detecting assembly having a laser emitter to emit a detection-purpose laser beam and to scan a programmed welding area on the workpiece by the detection-purpose laser beam, and a line CCD receiver receiving the laser beam reflecting from the area of the workpiece to detect the desired weld line. The line CCD measures a distance between the line CCD per se and the weld line, and also detects the shape of a weld area of the workpiece. The measured and detected data from the line CCD of the weld-line detecting device is used to control and adjust the path of the movement of the welding torch and the spacing between the end of the welding torch and the desired weld line in the workpiece to thereby perform accurate arc welding on the workpiece.

At this stage, when the desired weld line of any workpiece is relatively long containing therein a curved weld line portion, the laser-type weld-line detecting device is constructed so as to accommodate a rotating mechanism therein so that the laser emitter of the device is permitted to emit the detection laser, and to scan the curved weld line on the workpiece. When the laser-type weld-line detecting device accommodating therein the rotating mechanism is mounted on the automatic welding machine such as an industrial welding robot provided with a welding torch, the weld-line detecting device is disposed at a position adjacent to the welding torch mounted on the automatic welding machine. Therefore, when the laser-type weld-line detecting device is continuously used to detect a desired weld line in response to a continuous welding operation of the automatic welding machine, the detecting device is continuously and directly subjected to a welding heat generated by and transmitting from the welded portion of the workpiece. Further, the laser emitter, consisting of a semiconductor laser source, generates heat during the detecting operation. Thus, the detecting device is placed in a thermally critical condition if it is not suitably cooled. When the detecting device is heated, the accuracy in the detecting operation thereof is reduced by the heat and the operating life of the laser-type weld-line detecting device is also reduced. Namely, the laser-type weld-line detecting device is apt to be damaged by heat.

In order to prevent damage to the laser-type weld-line detecting device, two different corrective methods have been used, one being a method of predetermining the limit of continuous operation of the laser-type weld-line detecting device so as to prevent reduction in the detecting accuracy and in the operating life of the device, and the other being a method of applying liquid cooling to the head portion of the laser-type weld-line detecting device.

Nevertheless, the former method is defective in that the automatic welding machine cannot work at a high operation efficiency. Particularly, while the automatic welding machine is operated, the atmospheric temperature is gradually increased in response to an advance of the arc-welding of a workpiece, and accordingly, the laser-type weld-line detecting device must often be stopped in its operation resulting in a reduction in the operation efficiency of the automatic welding machine.

The latter method of employing a cooling liquid requires incorporation of a hermetic seal means into the detecting device for preventing the cooling liquid from directly contacting the laser emitter and the line CCD unit of the laser-type weld-line detecting device. Further, when the liquid cooling means is broken, the laser-type detecting device may be easily damaged.

Furthermore, when the liquid cooling method is employed, frequent maintenance of the laser-type detecting device is required from the viewpoint of checking the adequacy of hermetic seal to thereby prevent the cooling liquid from entering the detecting device, and accordingly, the operating efficiency of the automatic welding machine is lowered.

SUMMARY OF THE INVENTION

An object of the present invention is therefore to provide an apparatus for cooling a laser-type weld-line detecting device to be used with a welding torch of an automatic welding machine, which can eliminate the defects encountered by the conventional cooling means of the laser-type weld-line detecting device.

Another object of the present invention is to provide an apparatus capable of effectively cooling the laser-type weld-line detecting device and of being manufactured at a low cost.

A further object of the present invention is to provide a cooling apparatus for a laser-type weld-line detecting device of an automatic welding machine, especially the detecting device accommodating therein a rotating mechanism, by the use of cooling air.

In accordance with the present invention, there is provided an apparatus for providing air-cooling for a laser-type weld-line detecting device for an automatic welding machine having a welding torch effecting welding to a welded portion of a workpiece, the apparatus comprising:

a cooling air supply source for supplying cooling air under pressure through an air conduit;

a hollow housing unit arranged for defining a generally elongated spacing to house the laser-type weld-line detecting device therein to thereby prevent welding heat radiated by the welded portion of the workpiece from entering the hollow housing unit, the housing unit having two opposite ends located at the ends of the elongated spacing thereof;

a unit for defining a cooling-air flow-path within the hollow housing unit which extends from one of the opposite ends of said hollow housing unit toward the other of the opposite ends through said elongated spacing of said hollow housing unit, the cooling-air flow-path permitting the cooling air, supplied under pressure by the air supply source through the air conduit, to be introduced into the space in the hollow housing unit and to be delivered therefrom after cooling the laser-type weld-line detecting device housed in said housing unit; and, a cooling air flow regulating valve arranged in the air conduit between the cooling air supply source and the hollow housing unit for controlling the supply of the cooling air by the cooling air supply source in response to an external control signal.

In accordance with another aspect of the present invention, there is provided an apparatus for carrying out air-cooling of a laser-type weld-line detecting device for an automatic welding machine having a welding torch, wherein the laser-type weld-line detecting device including a laser-type weld-line detecting unit emitting a detection-purpose laser beam toward the welded portion of the workpiece and receiving the detection-purpose laser beam reflected from the welded portion of the workpiece, and a rotating mechanism for rotating the laser-type weld-line detecting unit about an axis of rotation thereof, the apparatus comprising:

a compressed air supply source for constantly supplying the cooling air under pressure through an air conduit;

a dehumidifying means for dehumidifying the cooling air under pressure supplied by the compressed air supply source;

a hollow housing means arranged for defining a generally elongated spacing to house the laser-type weld-line detecting device therein to thereby prevent welding heat radiated by the welded portion of the workpiece from entering the hollow housing means, the housing means having two opposite ends located at the ends of the elongated spacing thereof;

means for defining a cooling-air flow-path within the hollow housing means which extends from one of the opposite ends of the hollow housing means toward the other of the opposite ends through the elongated spacing of the hollow housing means, the cooling-air flow-path permitting the cooling air, under pressure and dehumidified by the dehumidifying means, to be introduced into the space in the hollow housing means and to be delivered therefrom after cooling the laser-type weld-line detecting device housed in the housing means; and, an additional cooling air supply system for constantly supplying the cooling air, under pressure and dehumidified by the dehumidifying means, directly to the interior of the laser-type weld-line detecting unit of the laser-type weld-line detecting device so as to cause a flow of the dehumidified cooling air under pressure in the laser-type weld-line detecting unit to thereby remove heat generated by the laser-type weld-line detecting unit.

BRIEF DESCRIPTION OF THE DRAWINGS

The above and other objects, features and advantages of the present invention will be made more apparent from the ensuing description of a preferred embodiment thereof with reference to the accompanying drawings wherein.

DESCRIPTION OF THE PREFERRED EMBODIMENT

Figure 1:
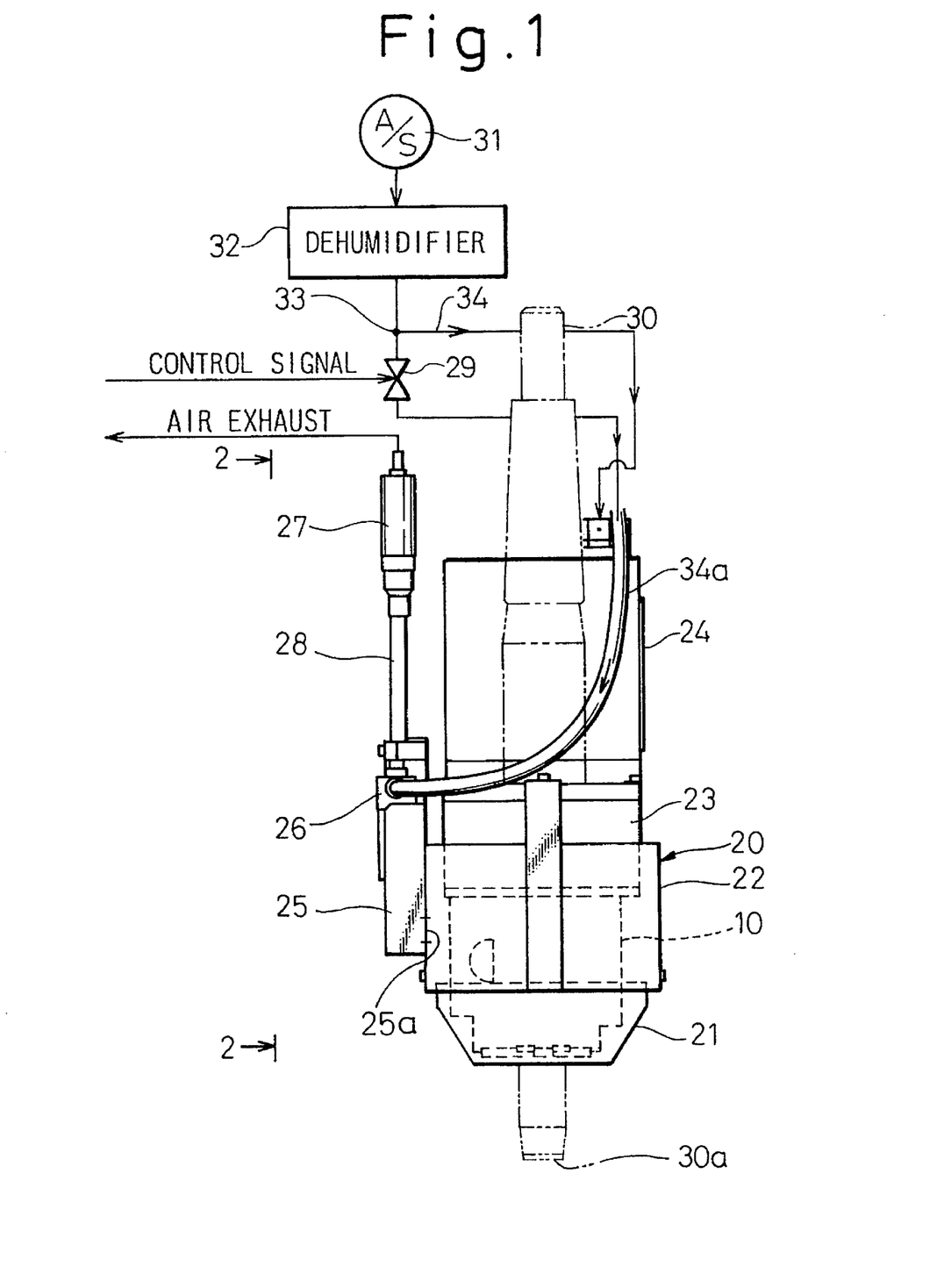
FIG. 1 is a front elevation view of a laser-type weld-line detecting device for an automatic welding machine, provided with an apparatus for air-cooling the detecting device according to an embodiment of the present invention.
Figure 2:
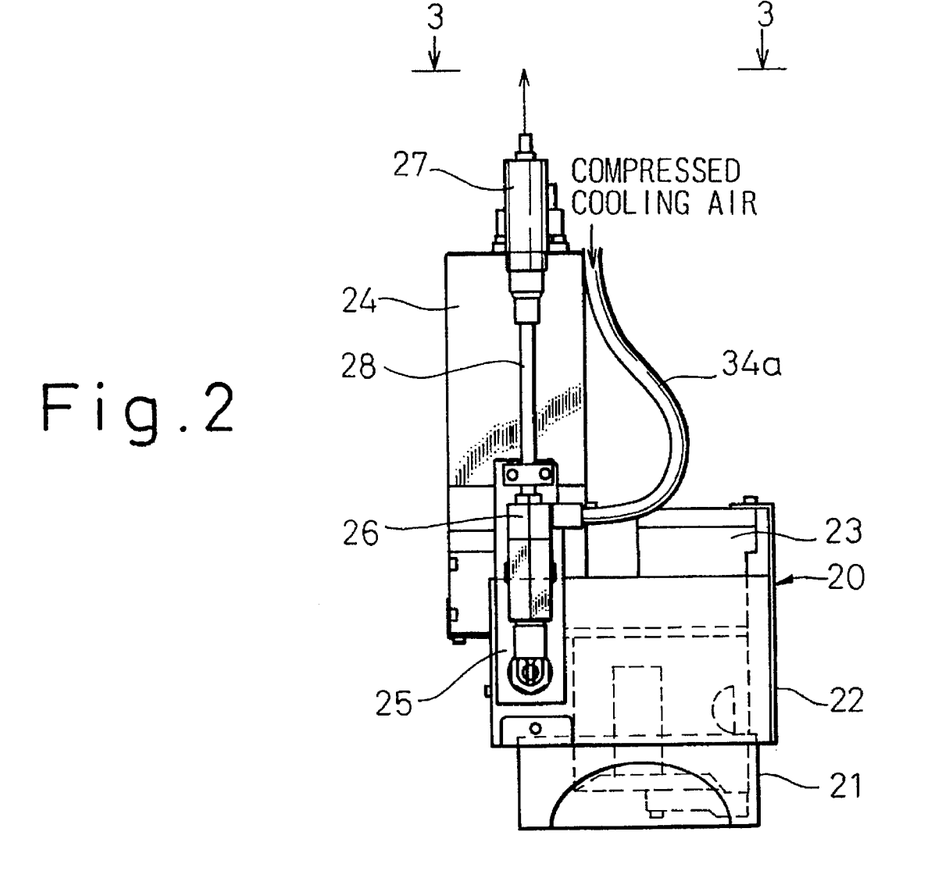
FIG. 2 is a side view of the laser-type weld-line detecting device provided with the air cooling apparatus according to the embodiment of the present invention, taken from the line 2—2 of FIG. 1.
Figure 3:
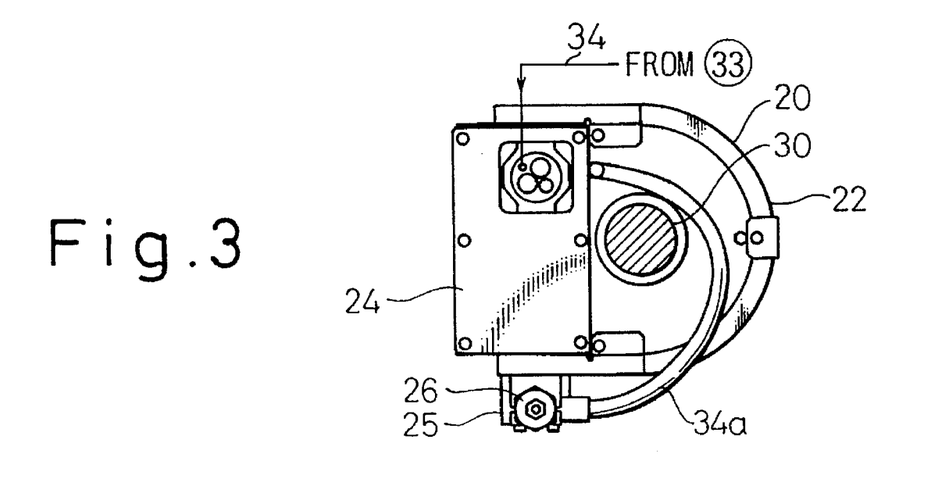
FIG. 3 is a plan view taken along the line 3—3 of FIG. 2.

Referring to FIGS. 1 through 3, the laser-type weld-line detecting device to be mounted on an automatic welding machine (not shown) such as a industrial welding robot, and provided with an air-cooling apparatus according to an embodiment of the present invention, includes a laser-type weld-line detecting unit 10 accommodated therein to measure a distance between a welded portion of a workpiece and the detecting unit, to detect a weld line of a workpiece along which the associated automatic welding machine applies arc-welding to the workpiece.

The laser-type weld-line detecting unit 10 is arranged close to a welding torch 30 which vertically extends through the detecting unit 10. Since the welding torch 30 is not a part of the laser-type weld-line detecting unit 10, it is shown by a phantom line to indicate only the positional relationship between the detecting unit 10 and the welding torch 30. The welding torch 30 is provided with a welding end 30a for discharging an electric arc toward a welded portion of a workpiece (not shown) when it is operated in response to the detection of a desired weld line of the workpiece by the laser-type weld-line detecting unit 10. Namely, the vertical distance of the welding end 30a of the welding torch 30 with respect to the welded portion of the workpiece and the alignment of the welding end 30a with the desired weld line are detected by the laser-type weld-line detecting unit 10, and are used for controlling the vertical position, the posture, and the weld-line alignment of the welding torch 30, via an automatic welding machine such as an industrial welding robot. Therefore, it should be understood that the welding torch 30 is attached to e.g., an end of a wrist of the industrial welding robot by using an appropriate mounting bracket (not shown).

The laser-type weld-line detecting unit 10 of the laser-type weld-line detecting device is entirely enclosed by a later-described heat-interruption housing 20. The heat-interruption housing 20 is formed as a means for preventing heat generated by the welding of the workpiece from being directly transmitted to the detecting unit 10 during the welding operation of the welding torch 30 of the automatic welding machine. The heat-interruption housing 20 is made of a metallic plate, preferably, a stainless steel plate, and is provided with the structure of a empty housing for containing therein the major portion of the laser-type weld-line detecting unit 10. However, it should be understood that there is a definite spacing left between the laser-type weld-line detecting unit 10 and the inner wall of the heat-interruption housing 20. Namely, the spacing between the laser-type weld-line detecting unit 10 and the inner wall of the heat-interruption housing 20 is provided for permitting a later-described cooling air, under pressure, to flow therethrough. The heat-interruption housing 20 is provided with a front portion consisting of a housing head 21 and a middle portion consisting of an intermediate housing portion 22 enclosing the base portion of the detecting unit 10. The housing head 21 has a shape such that it can act so as to prevent the welding heat generated by the welded portion of the workpiece from being transmitted to the detecting unit 10. The shape of the housing head 21 is also formed so that the opposite side faces do not interfere with articles or items disposed around the automatic welding machine. Namely, the opposite side faces of the housing head 21 are converged downward as described later in connection with FIGS. 4A and 4B. The housing head 21 is further provided with through-openings to permit cooling air after it has cooled the device to escape from the interior of the heat-interruption housing 20 toward the atmosphere.

The intermediate housing portion 22 has the shape of a hollow box, provided with a holder portion therein, capable of holding both the welding torch 30 and the laser-type weld line detecting unit 10 in a condition such that the torch 30 and the detecting unit 10 are mutually spaced apart. As shown in FIG. 1, a rotating mechanism 23 for rotating the laser-type weld-line detecting unit 10 about an axis at a sufficiently reduced rotating speed is mounted on the intermediate housing portion 22. The rotating mechanism 23 per se is a known mechanism including a reduction gear therein connected to a drive motor (not shown) housed in an upper casing 24 positioned above the rotating mechanism 23. Thus, a detailed description of the rotating mechanism 23 is omitted here. It should, however, be noted that the drive motor encased in the upper casing 24 is operatively connected to a control unit of the automatic welding machine, such as a robot control unit so as to be controlled by the control unit.

The intermediate housing portion 22 of the heat-interruption housing 20 is provided with a bracket 25, attached to one of the outer sides of the housing portion 22, holding a cooler unit 26. The cooler unit 26 has a built-in expansion valve functioning as a heat exchanger. Thus, a pressurized air supplied by a compressed air supply source 31 via an air dehumidifier 32 (FIG. 1) is subjected to a heat exchanging operation carried out by the expansion valve so as to be changed into a cold cooling air under pressure. The cold cooling air is introduced into the intermediate housing portion 22 of the heat-interruption housing 20, and hot air, generated during the heat exchanging operation, is exhausted by the cooler unit 26 toward the atmosphere via an air-exhaustion conduit 28 having a silencer 27 disposed at an extreme end of the air-exhaustion conduit 28. More specifically, the above-mentioned cooler unit 26 is supplied with a dehumidified and compressed air from the compressed air source 31 via an air conduit 34a after passing through the dehumidifier 32 and a flow regulating valve 29 of a solenoid valve type. The dehumidified and compressed air is subjected to the heat exchanging operation due to adiabatic expansion of the air to be resultingly changed into the above-mentioned cold and dry air under pressure. The flow regulating valve 29 is controlled by an external control signal supplied by the control unit such as the robot control unit, and is opened when the dehumidified and compressed air is to be supplied to the cooler unit 26.

The cold and dry air under pressure introduced into the intermediate housing portion 22 of the heat-interrupting housing 20 flows in the interior of the housing portion 22 so as to pass the laser-type weld-line detecting unit 10. Thus, the cold air under pressure cools the laser-type weld-line detecting unit 10, and also removes heat from the heat-interruption housing 20 from inside when the heat-interruption housing 20 is heated by the welding heat. Since the cooling air under pressure is dehumidified before entering into the intermediate housing portion 22, the inside of the housing portion 22 is not moistened by the cooling air under pressure.

On the other hand, there is provided a branching point 33 in the air conduit between the dehumidifier 32 and the flow regulating valve 29 as shown in FIG. 1, and an additional air conduit 34 is provided for constructing a later-described constant air-cooling supply system different from the above-described air cooling system incorporating the flow regulating valve 29 therein. The additional air conduit 34 extending from the branching point 33 is arranged so as to pass though the interior of the upper casing 24 encasing the drive motor of the rotating mechanism 23, and is eventually connected to the laser-type weld-line detecting unit 10 in the intermediate housing portion 22. Thus, the additional air conduit 34 constantly supplies dehumidified and compressed air into the laser-type weld-line detecting unit 10. It should be understood that since the dehumidified and compressed air conveyed and supplied by the additional conduit 34 does not pass through the cooler unit 26, the air is not subjected to a heat exchanging operation and is not cooled. Therefore, the compressed and dehumidified air supplied into the laser-type weld-line detecting unit 10 is usually maintained at near room temperature, and flows past a semiconductor type laser-beam emitter and a galvanometer provided for rotating a laser-beam rotating mirror indispensably incorporated in the laser-type weld-line detecting unit 10, in order to remove heat generated by the semiconductor type laser-beam emitter while it is emitting the detection-purpose laser beam. The compressed and dehumidified air having removed the heat is discharged from the unit 10 to the atmosphere while providing an air-curtain effect for the openings of the unit 10 through which the detection purpose laser beam is emitted from the unit 10 and the laser beam reflecting from the welded portion of the workpiece is received. The air curtain contributes to preventing the openings from being contaminated by welding sputters and welding fumes generating during the welding operation of the automatic welding machine.

Figure 4A:
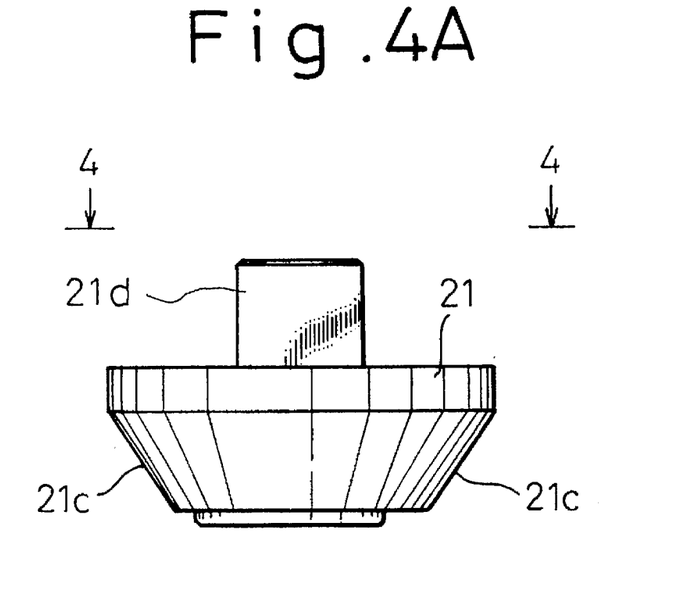
FIG. 4A is a front view of a head portion of a vacant heat-interruption housing unit suitable for being mounted on the laser-type weld-line detecting device.
Figure 4B:
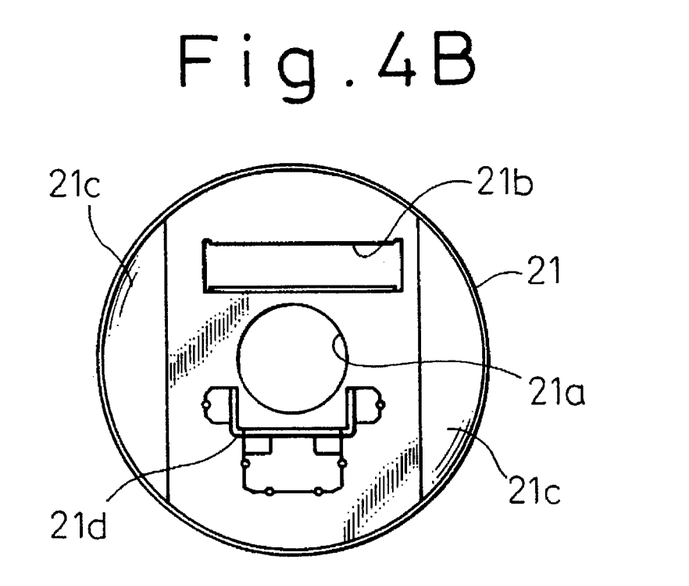
FIG. 4B is a plan view of the head portion of the vacant heat-interruption housing unit, taken from the line 4—4 of FIG. 4A.

Referring now FIGS. 4A and 4B, the housing head 21 of the heat-interrupting housing 20, made of a metallic plate, is provided with an opening 21a through which the welding torch 30 (FIG. 1) is inserted so as to be mounted in the laser-type weld-line detecting device. The housing head 21 is further provided with an opening 21b through which the detection-purpose laser beam is emitted, and is received after being reflected from the welded portion of the workpiece. The opening 21b is also used for permitting the cooling air to be discharged therethrough into the atmosphere.

In order to allow the detection-purpose laser beam emitted from the laser-type weld-line detecting unit 10 to surely and accurately scan the welded portion of the workpiece, the opening 21b of the housing head 21 is formed in an elongated opening having a rectangular shape. Namely, the scanning laser beam is not blocked by the edge of the opening 21b.

The housing head 21 is further provided with two inclined side faces 21c, 21c converging downward. Thus, during the welding operation of the automatic welding machine, when it is necessary to incline the welding torch 30 (FIG. 1) from a vertical posture thereof with respect to the workpiece in order that the end 30a of the welding torch 30 is accurately directed toward a desired weld line, the housing head 21 does not cause a physical interference with an article or a portion of the workpiece around the welding torch 30, due to provision of the above-mentioned inclined faces 21c, 21c.

The housing head 21 is further provided with an inner support plate 21d for supporting the welding torch 30 inside the housing head 21. The support plate 21d is rigidly welded to the inner wall of the housing head 21.

The housing head 21 is attached to a lower portion of the laser-type weld-line detecting unit 10 by appropriate fixing means such as screws, so as to be rotated together with the unit 10 during the welding operation.

Figure 5A:
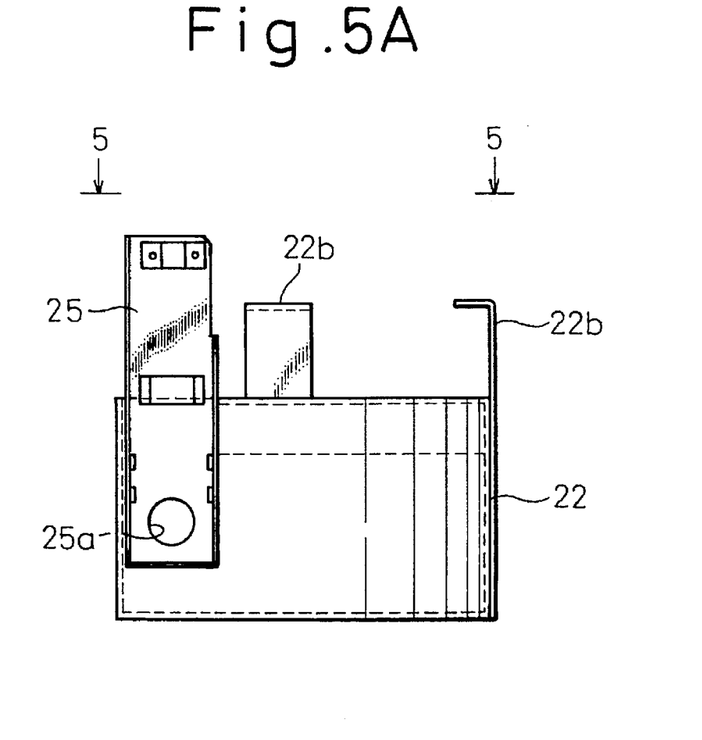
FIG. 5A is a front view of an intermediate portion of the vacant heat-interruption housing unit.
Figure 5B:
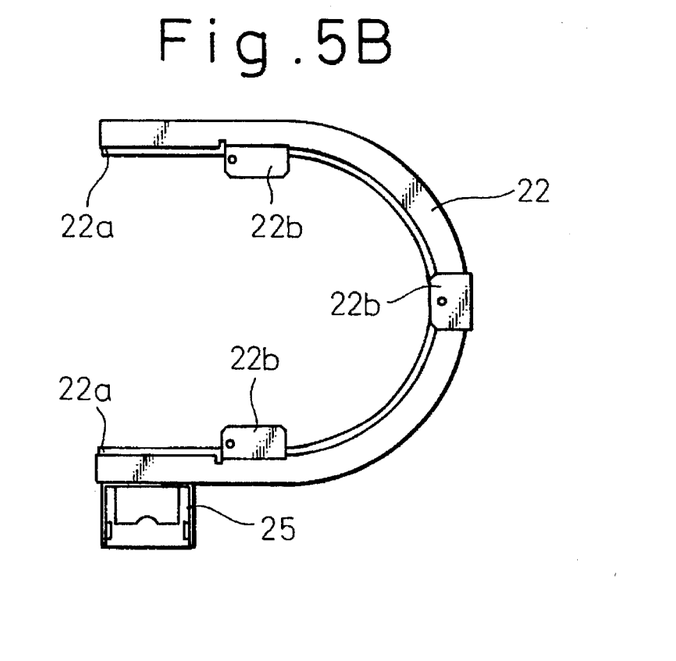
FIG. 5B is a plan view taken from the line 5—5 of FIG. 5A.

Referring to FIGS. 5A and 5B, the intermediate housing portion 22 of the heat-interruption housing 20 is formed to have a wall portion enclosing the laser-type weld-line detecting unit 10, and is made of a metallic plate such as stainless steel plate, similar to the housing head 21. The wall portion of the intermediate housing portion 22 has a hollow shape, and is provided with an opening through which the intermediate housing portion 22 is permitted to be attached to the laser-type weld-line detecting unit 10. When the intermediate housing portion 22 of the heat-interruption housing 20 is attached to the unit 10, there is provided a space between the wall portion of the intermediate housing portion 22 and the unit 10 so that the afore-described cold and pressurized cooling air flows therethrough to cool the unit 10 and the wall portion of the intermediate housing portion 22.

The intermediate housing portion 22 is provided with the afore-mentioned bracket 25 fixedly secured to the outer face thereof by means of e.g., a welding method. The bracket 25 has an opening 25a through which the afore-described cooler body 26, held by the bracket 25, is able to introduce the cold cooling air into the interior of the intermediate housing portion 22. Two opposite inner portions 22a, 22a of the intermediate housing portion 22 arranged adjacent to the above-mentioned opening are appropriately sealed by a known sealing member or like covering member for preventing leakage of the cooling air.

The intermediate housing portion 22 has three claw-like brackets 22b by which the portion 22 is attached to the afore-mentioned rotating mechanism 23.

Figure 6A:
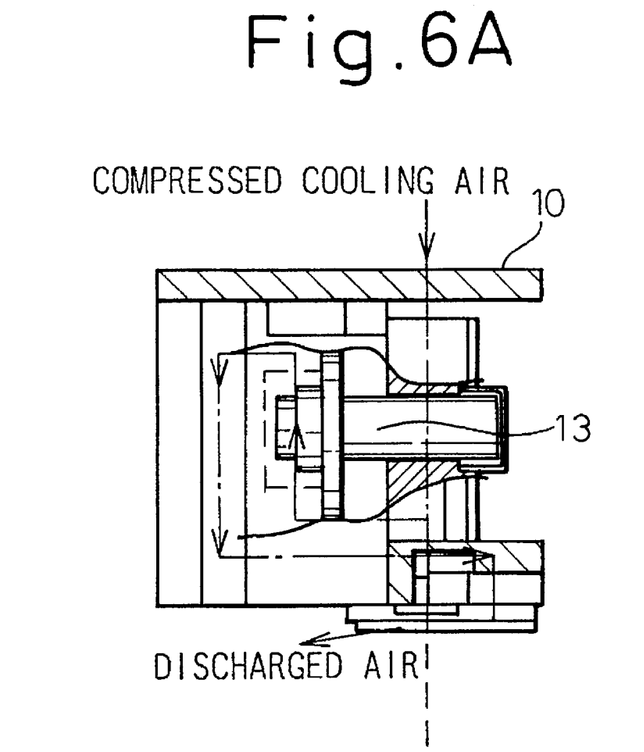
FIG. 6A is a front view of a laser-type weld-line detecting assembly incorporated in the laser-type weld-line detecting device, illustrating an air-cooling line constantly applying air-cooling to the detecting assembly.
Figure 6B:
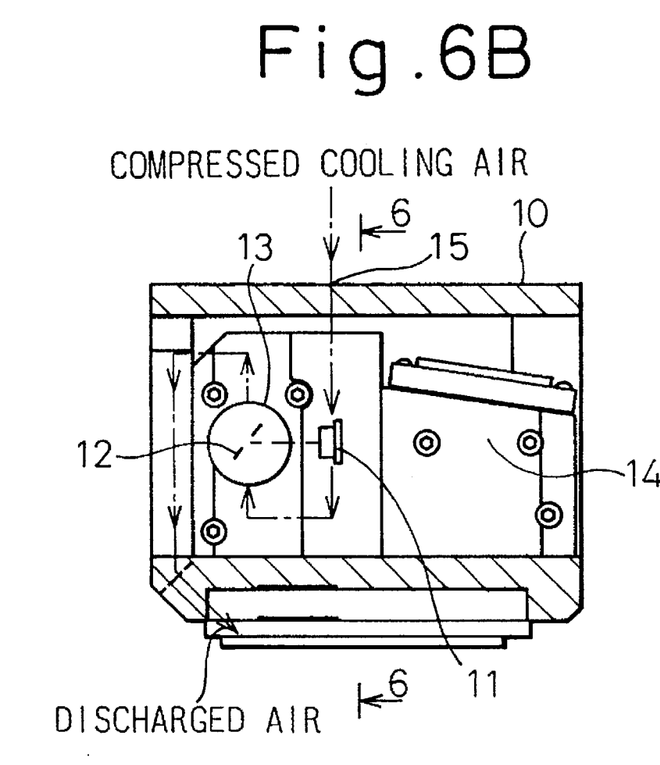
FIG. 6B is a side view of the laser-type weld-line detecting assembly shown in FIG. 6A, and illustrating the same air cooling line as that of FIG. 6A.

Referring to FIGS. 6A and 6B, the afore-mentioned constant cooling air supply system is shown, which introduces the dehumidified and compressed cooling air into the laser-type weld-line detecting unit 10 via the air conduit 34 extending from the branching point 33, and via the motor casing 34 shown FIG. 1. As shown in FIGS. 6A and 6B, the cooling air supplied by the constant cooling air supply system advances along a dot-dash-line in the laser-type weld-line detecting unit 10.

The detecting unit 10 of the laser-type weld-line detecting device enclosed by the heat-interruption housing 20 includes a semiconductor laser beam source 11 for emitting a detection-purpose laser beam, a scanning mirror 12, a galvanometer 13 providing a scanning operation for the scanning mirror 12, and a light detecting component 14 incorporating therein a CCD for receiving and detecting the detection-purpose laser beam when the beam is reflected from the welded portion of the workpiece. Thus, the dehumidified and compressed cooling air introduced through an upper opening 15 into the unit 10 flows past these components 11 through 14, so that the heat generated by the semiconductor laser beam source 11 during emission of the detection-purpose laser beam, and the heat generated by the coils of the galvanometer 13 are removed by the flow of cooling air. Thus, the long and accurate operation of the semiconductor laser beam source 11 and the galvanometer 13 can be guaranteed. Further, reduction in the performance of the light detecting component 14 due to heat can be prevented.

Furthermore, the additional cooling air supply system can prevent transmission of heat to the laser-type weld-line detecting unit 10 from the other heat generative components and portions such as the welding torch 30, and the welded portion of the workpiece.

When the dehumidified and compressed cooling air of the additional cooling air supply system is discharged from the interior of the laser-type weld-line detecting unit 10, it flows past the openings of the laser-type weld-line detecting unit 10 through which the detection-purpose laser beam is emitted toward the welded portion of the workpiece, and the laser beam reflecting from the welded portion of the workpiece is received. Thus, the discharged flow of the dehumidified and compressed cooling air provides an air curtain effect for the openings as shown in FIG. 6A so as to prevent welding sputters and fumes dispersed from the welded portion of the workpiece from entering into the unit 10. Therefore, the laser-beam type weld-line detecting unit 10 can be prevented from being internally contaminated.

From the foregoing description of the preferred embodiment, it will be understood that the air cooling apparatus according to the present invention uses the combination of the heat-interruption housing enclosing the laser-type weld-line detecting device, the dehumidified and compressed cold air flowing in the spacing between the heat-interruption housing and the laser-type weld-line detecting unit, and the constantly supplied dehumidified and compressed air introduced into the laser-type weld-line detecting unit, and contributes to effective cooling of the laser-type weld-line detecting device provided for the automatic welding apparatus such as the industrial welding robot.

Particularly, the use of the dehumidified cooling air under pressure and the use of the flow regulating valve used for controlling the supply of the low-temperature cooling air can permit a continuous operation of the laser-type weld-line detecting device having a rotating mechanism integrally incorporated therein for a long automatic operation time of the automatic welding machine. Consequently, the performance of the laser-type weld-line detecting device can be accurate and constant for a long operation life resulting in a remarkably improving the operation of the automatic welding machine over that of the machine provided with the conventional cooling means for the laser-type weld-line detecting device.

Further, the use of air as a coolant can realize economized operation of the cooling means for the laser-type weld-line detecting device provided for the automatic welding machine.

What we claim:

1. An apparatus for providing air-cooling for a laser-type weld-line detecting device for an automatic welding machine having a welding torch effecting welding to a welded portion of a workpiece, comprising:

a cooling air supply source for supplying a cooling air under pressure through an air conduit means;

a hollow housing means arranged for defining a generally elongated space to house the laser-type weld-line detecting device therein to prevent welding heat radiated by the welded portion of the workpiece from entering the hollow housing means, the housing means having two opposite ends located at the ends of the elongated spacing thereof;

means for defining a cooling-air flow-path within said hollow housing means which extends from one of the opposite ends of said hollow housing means toward the other of the opposite ends through said elongated space in said hollow housing means, said cooling-air flow-path permitting the cooling air under pressure supplied by said air supply source through said air conduit means to be introduced into the space in the hollow housing means and to be delivered therefrom after cooling the laser-type weld-line detecting device housed in said housing means; and, a cooling air flow regulating valve means arranged in said air conduit means between said cooling air supply source and said hollow housing means for controlling the supply of the cooling air by said cooling air supply source in response to an external control signal, wherein said cooling air supply source for supplying dehumidified cooling air under pressure comprises at least a compressed air supply source for constantly supplying the cooling air under pressure, and a dehumidifying means for dehumidifying the cooling air under pressure prior to passing through said cooling air flow regulating valve means, said apparatus further comprising an additional cooling air supply system for constantly supplying the cooling air under pressure and dehumidified by said dehumidifying means to an interior of said laser-type weld-line detecting device so as to cause a flow of the cooling air under pressure to thereby remove heat generated by said laser-type weld-line detecting unit.

2. An apparatus for providing air-cooling for a laser-type weld-line detecting device according to claim 1, wherein said laser-type weld-line detecting device comprises a laser-type weld-line detecting unit arranged adjacent to said welding torch and detects a desired weld line in said welded portion of said workpiece by using a detection-purpose laser beam, said laser-type weld-line detecting unit being operatively connected to a rotating mechanism so as to be rotated about an axis of rotation thereof, and wherein said hollow housing means comprises a housing head portion for enclosing a lower end portion of said laser-type weld-line detecting unit, and an intermediate housing portion connected to said housing head portion for enclosing an intermediate portion of said laser-type weld-line detecting unit, said housing head portion having a first opening through which said welding torch is projected toward the welded portion of the workpiece and a second opening through which said detection-purpose laser beam is emitted and received by said laser-type weld-line detecting unit, said first and second openings permitting the dehumidified cooling air under pressure to be discharged from said hollow housing means.

3. An apparatus for providing air-cooling for a laser-type weld-line detecting device according to claim 1, wherein said cooling air supply source further comprises:

an air cooler means including an expansion valve means therein for applying a heat exchanging effect to said cooling air under pressure dehumidified by said dehumidifying means to thereby generate a low temperature dehumidified cooling air under pressure, said low temperature dehumidified cooling air under pressure being supplied to said means for defining a cooling-air flow-path.

4. An apparatus for providing air-cooling for a laser-type weld-line detecting device according to claim 3, wherein said housing head portion and said intermediate housing portion of said hollow housing means are made of a metallic plate material, said housing head portion being provided with two inclined faces converging downward at a lower end portion thereof to prevent physical interference of said hollow housing means with at least said workpiece.

5. An apparatus for providing air-cooling for a laser-type weld-line detecting device according to claim 4, wherein said intermediate housing portion of said hollow housing means is provided with a bracket plate attached thereto for rigidly holding said air cooler means, said bracket plate providing an opening to enable said dehumidified low temperature cooling air under pressure generated by said air cooler means to enter said intermediate housing portion.

6. An apparatus for providing air-cooling for a laser-type weld-line detecting device for an automatic welding machine having a welding torch effecting welding to a welded portion of a workpiece, wherein said laser-type weld-line detecting device including a laser-type weld-line detecting unit emits a detection-purpose laser beam toward said welded portion of the workpiece and receives the detection-purpose laser beam reflected from said welded portion of the workpiece, and a rotating mechanism for rotating said laser-type weld-line detecting unit about an axis of rotation thereof, said apparatus comprising:

a compressed air supply source for constantly supplying the cooling air under pressure through an air conduit;

a dehumidifying means for dehumidifying the cooling air under pressure supplied by said compressed air supply source;

a hollow housing means arranged for defining a generally elongated space to house said laser-type weld-line detecting device therein to thereby prevent welding heat radiated by the welded portion of the workpiece from entering said hollow housing means, said housing means having two opposite ends located at the ends of said elongated spacing thereof;

means for defining a cooling-air flow-path within said hollow housing means which extends from one of the opposite ends of said hollow housing means toward the other of the opposite ends through said elongated space in said hollow housing means, said cooling-air flow-path permitting the cooling air under pressure and dehumidified by said dehumidifying means to be introduced into the space in said hollow housing means and to be delivered therefrom after cooling said laser-type weld-line detecting device housed in said housing means; and, an additional cooling air supply system for constantly supplying the cooling air under pressure and dehumidified by said dehumidifying means directly to an interior of said laser-type weld-line detecting unit of said laser-type weld-line detecting device so as to cause a flow of the dehumidified cooling air under pressure in said laser-type weld-line detecting unit to thereby remove heat generated by said laser-type weld-line detecting unit.

7. An apparatus for providing air-cooling for a laser-type weld-line detecting device according to claim 6, wherein said laser-type weld-line detecting unit having an elongated opening thereof through which said detection-purpose laser beam is commonly emitted and received, and, wherein said additional cooling air supply system further comprising means for providing an air curtain effect to the opening of said laser-type weld-line detecting unit to thereby prevent the entrance of welding sputters and welding fumes into said laser-type weld-line detecting unit.

8. An apparatus for providing air-cooling for a laser-type weld-line detecting device according to claim 6, further comprising;

a cooling air flow regulating valve means arranged in said air conduit means between a portion downstream said dehumidifying means and said hollow housing means for regulating the flow of said dehumidified cooling air under pressure; and, an air cooler means including an expansion valve means therein for applying a heat exchanging effect to said dehumidified cooling air under pressure so as generate a low temperature dehumidified cooling air under pressure, said low temperature dehumidified cooling air under pressure being supplied to said means for defining a cooling-air flow-path.

9. An apparatus for providing air-cooling for a laser-type weld-line detecting device for an automatic welding machine having a welding torch effecting welding to a welded portion of a workpiece, comprising:

a cooling air supply source for supplying a cooling air under pressure through an air conduit means;

a hollow housing means arranged for defining a generally elongated space to house the laser-type weld-line detecting device therein to prevent welding heat radiated by the welded portion of the workpiece from entering the hollow housing means, the housing means having two opposite ends located at the ends of the elongated spacing thereof;

means for defining a cooling-air flow-path within said hollow housing means which extends from one of the opposite ends of said hollow housing means toward the other of the opposite ends through said elongated space in said hollow housing means, said cooling-air flow-path permitting the cooling air under pressure supplied by said air supply source through said air conduit means to be introduced into the space in the hollow housing means and to be delivered therefrom after cooling the laser-type weld-line detecting device housed in said housing means; and, a cooling air flow regulating valve means arranged in said air conduit means between said cooling air supply source and said hollow housing means for controlling the supply of the cooling air by said cooling air supply source in response to an external control signal, wherein said cooling air supply source for supplying dehumidified cooling air under pressure comprises at least a compressed air supply source for constantly supplying the cooling air under pressure, and a dehumidifying means for dehumidifying the cooling air under pressure prior to passing through said cooling air flow regulating valve means, wherein said laser-type weld-line detecting device comprises a laser-type weld-line detecting unit arranged adjacent to said welding torch and detects a desired weld line in said welded portion of said workpiece by using a detection-purpose laser beam, said laser-type weld-line detecting unit being operatively connected to a rotating mechanism so as to be rotated about an axis of rotation thereof, and wherein said hollow housing means comprises a housing head portion for enclosing a lower end portion of said laser-type weld-line detecting unit, and an intermediate housing portion connected to said housing head portion for enclosing an intermediate portion of said laser-type weld-line detecting unit, said housing head portion having a first opening through which said welding torch is projected toward the welded portion of the workpiece and a second opening through which said detection-purpose laser beam is emitted and received by said laser-type weld-line detecting unit, said first and second openings permitting the dehumidified cooling air under pressure to be discharged from said hollow housing means, said apparatus further comprising an additional cooling air supply system for constantly supplying the cooling air under pressure and dehumidified by said dehumidifying means to an interior of said laser-type weld-line detecting device so as to cause a flow of the cooling air under pressure to thereby remove heat generated by said laser-type weld-line detecting unit.

* * * * *